United States Patent
Ben Ze'ev (10) Patent No.: US 11,341,165 B2
(45) Date of Patent: May 24, 2022

(54) STAGING TABLES FOR DATA INGESTION OF MICRO-BATCHED DATA RECORDS

(71) Applicant: NICE LTD., Ra'anana (IL)

(72) Inventor: Lior Ben Ze'ev, Rosh Ha'ayin (IL)

(73) Assignee: NICE LTD., Ra'anana (IL)

( * ) Notice: Subject to any disclaimer, the term of this patent is extended or adjusted under 35 U.S.C. 154(b) by 39 days.

(21) Appl. No.: 17/021,132

(22) Filed: Sep. 15, 2020

(65) Prior Publication Data

US 2022/0083566 A1 Mar. 17, 2022

(51) Int. Cl.
*G06F 16/28* (2019.01)
*G06F 16/22* (2019.01)
*G06F 16/215* (2019.01)
*G06F 16/23* (2019.01)

(52) U.S. Cl.
CPC .......... *G06F 16/283* (2019.01); *G06F 16/215* (2019.01); *G06F 16/221* (2019.01); *G06F 16/2282* (2019.01); *G06F 16/2379* (2019.01)

(58) Field of Classification Search
CPC .................................................... G06F 16/283
USPC ........................................................ 707/736
See application file for complete search history.

(56) References Cited

U.S. PATENT DOCUMENTS

| | | | | |
|---|---|---|---|---|
| 10,996,857 | B1* | 5/2021 | Yang | G06F 3/0643 |
| 2008/0168082 | A1* | 7/2008 | Jin | G06F 8/20 |
| 2015/0081652 | A1* | 3/2015 | Bardini | G06F 16/2282 707/704 |
| 2017/0185647 | A1* | 6/2017 | Billington | G06F 16/9535 |
| 2018/0150504 | A1* | 5/2018 | Lee | G06F 16/27 |
| 2020/0012656 | A1* | 1/2020 | Pugh | G06F 16/2453 |

* cited by examiner

*Primary Examiner* — Syling Yen
(74) *Attorney, Agent, or Firm* — Haynes and Boone, LLP (57) ABSTRACT

A system is provided to provide near real-time updates to data tables for a data warehouse using a micro-batch manager. The system includes a processor and a computer readable medium operably coupled thereto, to perform table updating operations which include accessing a first staging data table comprising a plurality of records that was generated by the micro-batch manager for a first destination table of the data tables for the data warehouse, reading a merge instruction column of the first staging data table for the plurality of records, determining a merge operation for each of the plurality of records from reading the merge instruction column, merging the plurality of records from the first staging data table to the first destination table using the merge operation for each of the plurality of records, and deleting the plurality of records from the first staging data table after merging.

17 Claims, 5 Drawing Sheets

STAGING TABLES FOR DATA INGESTION OF MICRO-BATCHED DATA RECORDS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to data ingestion systems for real-time or near real-time updating of database tables, and more specifically to a system and method for generating a staging table of records that is merged with a database table, where the staging table includes a merge instruction column used to merge each record with the database table in a single thread.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized (or be conventional or well-known) in the prior art. The subject matter in the background section merely represents different approaches, which in and of themselves may also be inventions.

During use of different work systems, database updates and storage of data records may be required. For example, during big data use and storage, ingesting of the records for the big data may be required in real-time or near real-time (e.g., within a short delay of a few seconds or less after a record for big data is generated). This is required for persisting the records for big data so that analytics, artificial intelligence training, and reports utilizing big data are working with current and up-to-date records. This may include insert, update, and/or delete operations to persist data in a database, where these operations may insert new records, update previously inserted records, and/or delete those previously inserted records, respectively.

However, many modern data warehouses may only ingest records in real-time if those records do not require a lock of the database's tables to ingest and persist the records. When updates and deletes are required for a database table, a corresponding table is required to be locked, which locks objects within the database table during the database operation to avoid conflicts with other database operations with incoming records. Locking database tables may incur performance issues to ingest the records, which may delay the ingesting and persisting of the data by minutes or even hours. If the data warehouses ingest the updated and/or deleted records as insert records (e.g., by adding as additional insert database table rows), the data warehouse may further encounter performance issues due to table size. Further, running a report on such a database table requires filtering of all old records, thereby further utilizing computing resources and causing time delays.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. In the figures, elements having the same designations have the same or similar functions.

DETAILED DESCRIPTION OF PREFERRED EMBODIMENTS

This description and the accompanying drawings that illustrate aspects, embodiments, implementations, or applications should not be taken as limiting—the claims define the protected invention. Various mechanical, compositional, structural, electrical, and operational changes may be made without departing from the scope of this description and the claims. In some instances, well-known circuits, structures, or techniques have not been shown or described in detail as these are known to one of ordinary skill in the art.

In this description, specific details are set forth describing some embodiments consistent with the present disclosure. Numerous specific details are set forth in order to provide a thorough understanding of the embodiments. It will be apparent, however, to one of ordinary skill in the art that some embodiments may be practiced without some or all of these specific details. The specific embodiments disclosed herein are meant to be illustrative but not limiting. One of ordinary skill in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Overview

For a data ingestion system used to store data records, for example, for big data in data warehouses, methods, data structures, and systems are provided to ingest data records in real-time or near real-time (e.g., within a brief delay of seconds) using a staging table. A service provider, such as a CRM system, customer service system, business management system, organizational management system, or other networked service provider, may generate big data records when users (e.g., internal or external system users) utilize different operations to provide, generate, and process data. This may include user data, system data, operational data, output data, and/or other information that may be desirable to be stored for analytics, reports, processing, and/or training. When recording and storing data records for big data, one or more data warehouses may be used, which may include database tables for datasets in database systems of the data warehouse. However, when ingesting data, different database write operations to the target or destination database table may be utilized to persist data records to the database table. Persistence of data refers to an act or operation that causes the data to outlive the process that created the data, thereby storing the data as a record in a database so that the data may be used in a future operation, query, or request. In this regard, an insert operation may be used to insert a new record, an update operation may be used to update an existing record, and/or a delete operation may be used to delete an existing record. These operations may require locking of the database table in order to maintain atomicity and consistency (or other ACID database properties), as well as prevent conflicts in the database table. There may be significant time delays when a database table is locked, which prevents real-time or near real-time updating of database tables in a data warehouse.

A service provider utilizing a data warehouse to store data records may utilize a micro-batch manager to generate micro-batches of data records to persist to a destination or target database table. A micro-batch may include one or more (e.g., a set) of records for a particular dataset and corresponding table. Further, the micro-batch may have a corresponding threshold data batch size and/or accrual time period to limit the amount of data in the micro-batch or amount of time to accrue records in the micro-batch, respectively. For example, the micro-batch manager may limit the micro-batch of records to a specific batch data size (e.g., 1 MB of records), after which, no further records may be added to the micro-batch and the micro-batch may be processed to persist those records to storage. Conversely, if the threshold data batch size is not met for a specific time interval or period, such as every five seconds for a schedule persistence job, the micro-batch manager may further generate the micro-batch and discontinue adding further records to the micro-batch so that the records within the micro-batch may be persisted to storage in a real-time or near real-time manner (e.g., without significant delay).

Once the micro-batch of data records is generated, the micro-batch manager and/or a data ingestion system for the data records may generate one or more tables used to write or merge the records of the micro-batch to the destination table. Where only insert operations are required for the records in the micro-batch, an append only table may be generated of the records for persisting to the destination table. This append only table may be generated so that locking of the destination table is not required and insertions of the records may be performed with the destination table, thereby merging the append only table with the destination table. However, where insertions, updates, and deletions are required, a staging table may be generated for the micro-batch through inserts of the records in the micro-batch to the staging table. A column of the staging table may advantageously further include the merge instruction for each record in the micro-batch so that a corresponding merge operation (e.g., insert, update, or delete) is provided in the staging table for each record.

Once the staging table is generated, a destination merger may run scheduled jobs (e.g., every five seconds looking for new data records for persisting). The scheduled job may read the staging table and the merge instruction column to determine a merge operation for each record. This scheduled job may also function as the threshold time period, limit, or interval after which any micro-batch that has not reached the threshold data batch size is processed. This may be run as a single thread and may be performed without locking the table. Once the merge operation for each record is determined, the destination merger may then merge the changes to the destination table from the staging table. This allows changing of the destination table without locking of the table, and further may be performed in real-time or near real-time. Once the staging table has been processed and the changes merged with the destination table, the records in the staging table may be deleted so that the staging table is cleared. The destination table may be updated with a timestamp of the last merger to reflect the latest updates to the destination table. Thereafter, further records from additional micro-batches may be inserted to the destination table, which allows for further changes to one or more destination tables of the data warehouse.

The embodiments described herein provide methods, computer program products, and computer database systems for persisting data records to one or more database tables using a staging table having a merge instruction column. The service provider system associated with or incorporating the data ingestion system may therefore prepare records in a staging table so that the records may be persisted to a target or destination table in a faster manner and without locking the destination table. For example, the online system may provide real-time or near real-time persisting of records to the destination table through merge operations determined from a merge instruction column of the staging table. Once a merge operation is determined for a record in the staging table, changes to data in the destination table from the record may be merged in a faster and more convenient manner.

According to some embodiments, in a service provider computing system accessible by a plurality of separate and distinct organizations, a data ingestion system is provided for merging data records to a destination table from a staging table, thereby optimizing data storage times, reducing data storage resources and database locks, and providing faster processing and storage of data records.

Example Environment

Figure 1:
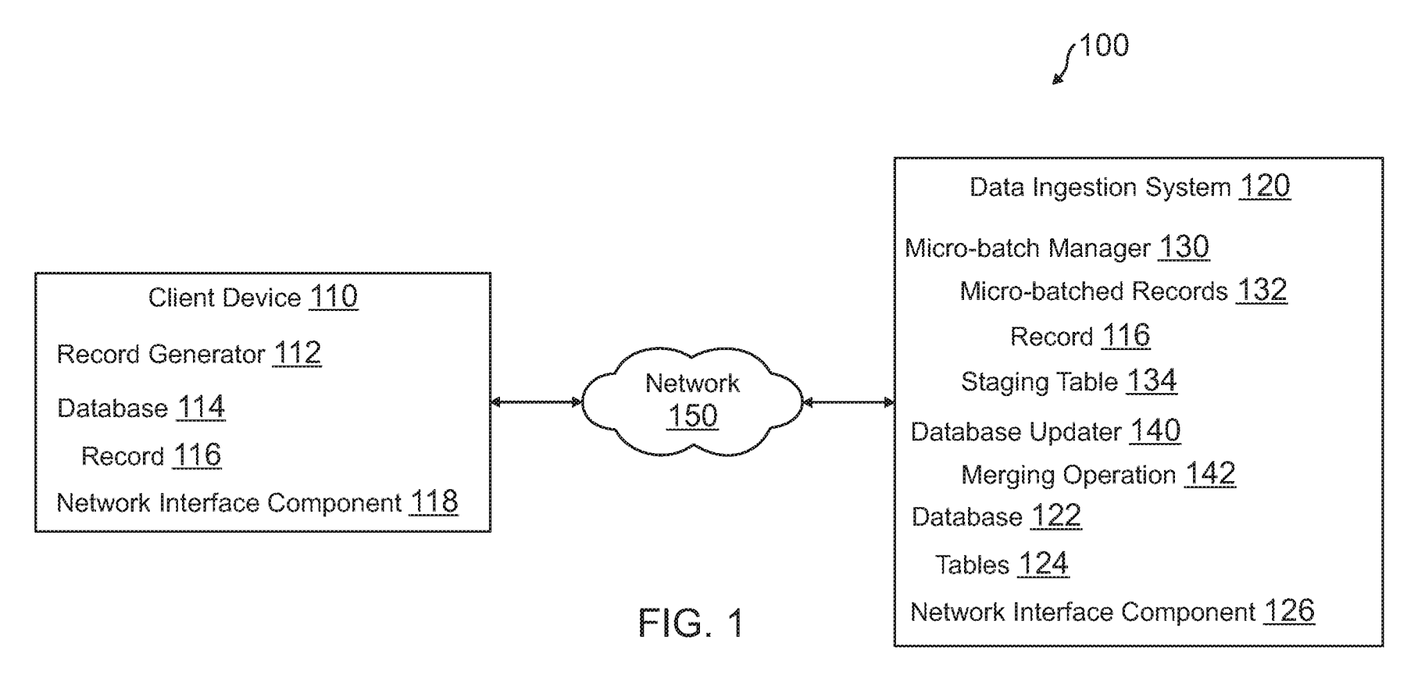
FIG. 1 is a simplified block diagram of a networked environment suitable for implementing the processes described herein according to an embodiment.

The system and methods of the present disclosure can include, incorporate, or operate in conjunction with or in the environment of a data ingestion service, system, database, and portal, which may include persisting of data records, such as for big data, to a data warehouse having one or more databases. FIG. 1 is a block diagram of a networked environment suitable for implementing the processes described herein according to an embodiment. As shown, an environment 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided, by such devices and/or servers may be combined or separated for a given embodiment and may be performed by a greater number or fewer number of devices and/or servers. One or more devices and/or servers may be operated and/or maintained by the same or different entities.

FIG. 1 illustrates a block diagram of an example environment 100 according to some embodiments. Environment 100 may include a client device 110 and a data ingestion system 120 that interact to provide real-time or near real-time storage of data records to one or more database tables.

In other embodiments, environment 100 may not have all of the components listed and/or may have other elements instead of, or in addition to, those listed above. In some embodiments, the environment 100 is an environment in which preparation and storage of data records may be performed. A client device 110 may be any machine or system that is used by a user to generate and/or provide one or more records to data ingestion system 120 for persistence to storage. Client device 110 can be a handheld computing device, a mobile phone, a laptop computer, a notepad computer, a work station, and/or a network of computing devices. As illustrated in FIG. 1, client device 110 might interact via a network 150 with data ingestion system 120, which stores data records using one or more staging tables having merge instructions in one or more columns of the staging tables.

Client device 110 may be utilized in order to initially generate and/or provide data for storage as a data record. For example, client device 110 and/or other client devices, servers, or online platforms may initially access an operation of data ingestion system 120 and/or another service provider utilizing data ingestion system for data storage. In this regard, a record generator 112 of client device 110 may be used to provide a record 116 to data ingestion system 120 for storage. Record 116 may be generated using an operation of data ingestion system 120 and/or based on data stored by client device 110. Thus, record 116 may initially be stored to a database 114 and/or generated from data in database 114, which may then be uploaded or otherwise provided to data ingestion system 120. A micro-batch manager 130 may receive record 116 from client device 110 and may implement operations to store and persist record 116 to a destination table from tables 124 in database 122.

Micro-batch manager 130 may generate a set of data records batched together for a batch processing job to persist the data records to one or more of tables 124 in database 122. In this regard, micro-batch manager 130 may utilize a threshold data batch size and/or a threshold batching or accrual time period, limit, or interval to determine micro-batched records 132 having at least record 116. The threshold data batch size may correspond to a threshold or maximum data size (e.g., in KB, MB, or the like) for a batch processing job so that the batch processing job does not exceed a maximum data size for data processing based on the batched records. This may allow for batching of data records into a batch processing job having this maximum data size so that the batch processing job is not too large to efficiently process. However, at certain times fewer records and/or smaller records may be received by micro-batch manager. Thus, meeting the threshold data batch size may take longer. To prevent micro-batch manager 130 from waiting too long to persist the received data records, a threshold batching or accrual time period may further be established to generate micro-batched records 132, which may be based on scheduled jobs occurring every X seconds for persisting records to storage. For example, batching of records into micro-batched records 132 may be limited to a period of time of about five seconds or about ten seconds, or the like, after which, micro-batched records 132 may be generated with the received records and processed for persisting to storage. This allows for smaller batch processing jobs than the threshold data batch size.

In order to store record 116 with the other records of micro-batched records 132, data ingestion system 120 may generate one or more staging tables by inserting data records for merging and persisting to one or more of tables 124 into the staging table(s). For example, micro-batch manager 130 may determine micro-batched records 132 for a batch processing job, where record 116 is included in micro-batched records 132. Thereafter, using micro-batched records 132, a staging table 134 is generated as a data file having the data records in micro-batched records 132 may be inserted to the rows of staging table 134. Where the records in micro-batched records 132 require only insertions to one or more of tables 124 in database 122, an append only table may be instead be generated. In such embodiments, the append only table may be used to insert the records of micro-batched records 132 into the corresponding destination table of tables 124, which may be done without locking the destination table and/or other ones of tables 124 through a single processing thread.

However, where micro-batched records 132 include insert, update, and/or delete operations for record 116 and/or other records in micro-batched records 132, staging table 134 may be generated by inserting the corresponding records to the rows of staging table 134. Additionally, a column of staging table 134 may be created for the corresponding operation for merging the record with the destination table, such as a merge operation for an insert, update, or delete of the corresponding record. In this regard, the column may correspond to merge instructions for the merge operation, where a value in the merge instruction column may include an identifier for the merge operation. For example, where the merge operation is an insert operation for the corresponding record (e.g., record 116), the value in the merge instruction column may be an "I" or another identifier corresponding to the insert operation. Similarly, for an update operation for a record, a "U" may be used in the merge instruction column, and for a delete operation for a record, a "D" may be used in the merge instruction column. Thus, each record is inserted to a row of staging table 134 and an I/U/D may be inserted to the cell in the merge instruction column for the record's row to denote an instruction for a merge operation (e.g., insert, update, or delete, respectively).

Once staging table 134 is generated and the records of micro-batched records 132 are inserted to staging table 134 with corresponding merge instructions, database updater 140 may then be used to update the corresponding destination or target table of tables 124. Database updater 140 may include a merging operation 142 that may read the rows of staging table 134 to persist records in staging table 134 (e.g., from micro-batched records 132) to the destination table of tables 124. Merging operation 142 may read the records from a row, and the corresponding merge instruction, to determine the record to merge with destination table based on the merge instruction. Merging operation 142 may determine a merge operation (e.g., insert, update, or delete) for the record in the row of staging table 134, and may execute the merge operation to merge the record with the destination table of tables 124. This allows for real-time or near real-time (e.g., within a few seconds) updating and persisting of data to tables 124. Further, the merge operation may be executed on the destination table of tables 124 without locking the destination table and/or other ones of tables 124 through utilization of a single thread when the scheduled job executes.

Figure 2:
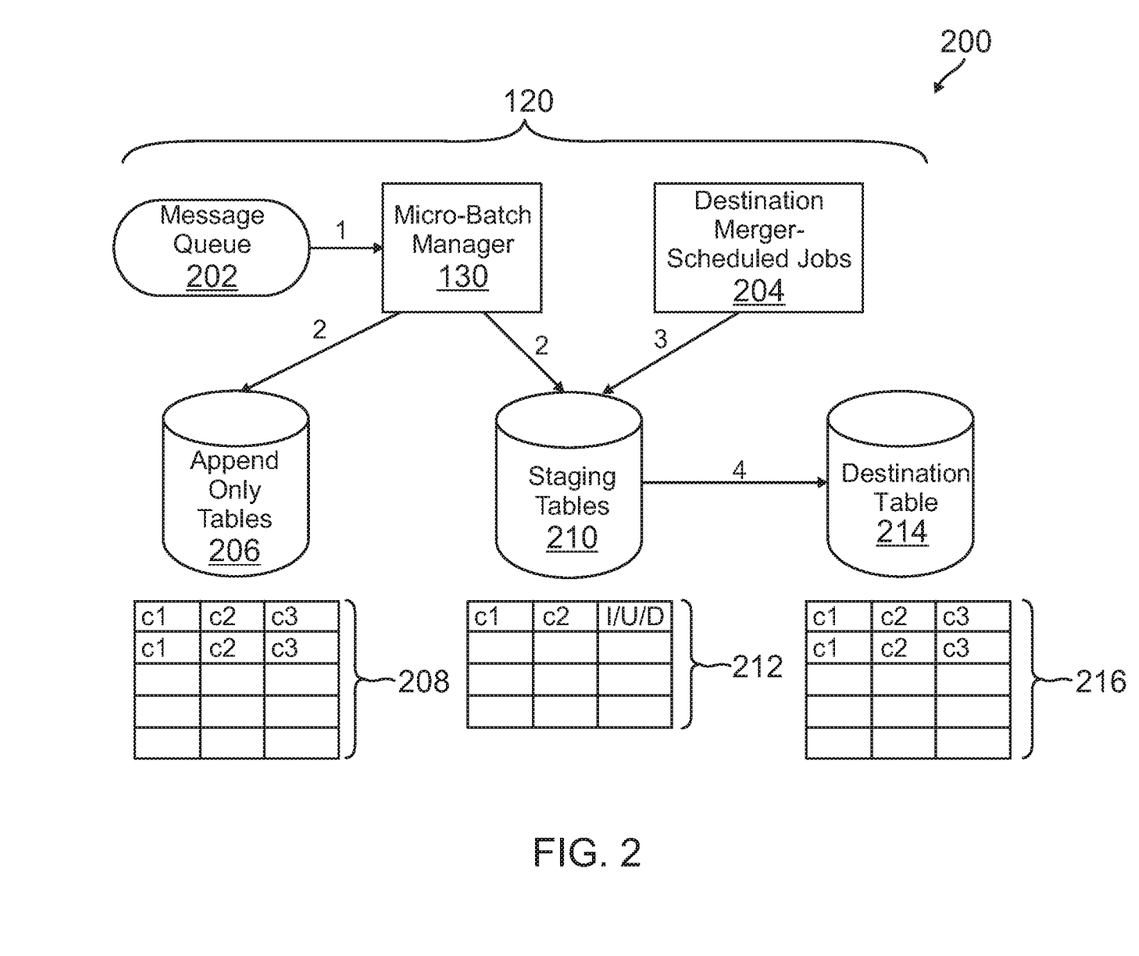
FIG. 2 is a simplified diagram of micro-batch manager and staging tables for data ingestion of micro-batched data records according to some embodiments.

An exemplary set of staging and destination tables are shown in FIG. 2 with the corresponding operations for storage of data records. Once merging operation 142 of database updater 140 has finished persisting all of the records from staging table 134 to the destination table of tables 124, database updater 140 may clear staging table 134 by deleting the records and merge instructions from the rows and columns of staging table 134. Once cleared, micro-batch manager 130 may further use staging table 134 and/or another staging table in order to further persist records to tables 124 without locking the tables and in real-time or near real-time. For example, additional records may be received and batched into micro-batch processing jobs, which may be inserted to rows of staging table 134 and/or another staging table, and update tables 124 as previously discussed.

Thus, a user of client device 110 may utilize record generator 112 with data ingestion system 120 to persist record 116 to one or more of tables 124 in a faster and more efficient manner. In some embodiments, the users of client device 110 may differ in their respective capacities, and the capacity of a particular client device 110 might be determined by applications, permissions, and profiles for the current user. Thus, different users will have different capabilities and perform different playback events with regard to accessing, providing, generating, and/or persisting data records to tables 124, for example, by different access levels to the data records and/or tables 124. However, this is not mandatory, and it is understood that client device 110 may generally have certain capacities that are universal to users, entities, or other clients (thereby not specific to operations and data records submitted for processing by data ingestion system 120).

Client device 110 may execute a web-based client that accesses a web-based application for data ingestion system 120, or may utilize a rich client, such as a dedicated resident application, to access data ingestion system 120. Client device 110 may utilize one or more application programming interfaces (APIs) to access and interface with data ingestion system 120 in order to persist data to storage, such as record 116 to tables 124. Thus, record generator 112 can be used to access data and applications hosted by data ingestion system 120 and to perform searches on stored data, for example, through providing a user interface to a user (e.g., a GUI output) or via an API of record generator 112. Interfacing with data ingestion system 120 may be provided through record generator 112 and may include data stored to database 114, such as record 116. Data ingestion system 120 may process and provide data through database 122, micro-batch manager 130, and database updater 140. Database 124 of data ingestion system 120 may store data associated with data storage warehouses, including tables 124 that may store data including big data and analytics.

Client device 110 might communicate with data ingestion system 120 using TCP/IP and, at a higher network level, use other common Internet protocols to communicate, such as hypertext transfer protocol (HTTP or HTTPS for secure versions of HTTP), file transfer protocol (FTP), wireless application protocol (WAP), etc. Communication between client device 110 and data ingestion system 120 may occur over network 150 using a network interface component 118 of client device 110 and a network interface component 126 of data ingestion system 120. In an example where HTTP/HTTPS is used, client device 110 might include an HTTP/HTTPS client commonly referred to as a "browser" for sending and receiving HTTP//HTTPS messages to and from an HTTP//HTTPS server, such as data ingestion system 120 via network interface component 118. Similarly, data ingestion system 120 may host an online platform accessible over network 150 that communicates information to and receives information from client device 110 via network interface component 126. Such an HTTP/HTTPS server might be implemented as the sole network interface between client device 110 and data ingestion system 120, but other techniques might be used as well or instead. In some implementations, the interface between client device 110 and data ingestion system 120 includes load sharing functionality. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

Client device 110 may utilize network 150 to communicate with data ingestion system 120, which is any network or combination of networks of devices that communicate with one another. For example, the network can be any one or any combination of a local area network (LAN), wide area network (WAN), telephone network, wireless network, point-to-point network, star network, token ring network, hub network, or other appropriate configuration. As the most common type of computer network in current use is a transfer control protocol and Internet protocol (TCP/IP) network, such as the global inter network of networks often referred to as the Internet. However, it should be understood that the networks that the present embodiments might use are not so limited, although TCP/IP is a frequently implemented protocol.

According to one embodiment, data ingestion system 120 is configured to provide webpages, forms, applications, data, and media content to client device 110 and/or to receive data from client device 110. In some embodiments, data ingestion system 120 may be provided or implemented in a server environment and/or cloud environment, which may be accessible through one or more APIs with or without a correspond graphical user interface (GUI) output. Data ingestion system 120 may further provide security mechanisms to keep data secure. Additionally, the term "server" is meant to include a computer system, including processing hardware and process space(s), and an associated storage system and database application (e.g., object-oriented data base management system (OODBMS) or relational database management system (RDBMS)). It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

Several elements in the system shown in FIG. 1 include elements that are explained briefly here. For example, client device 110 could include a desktop personal computer, workstation, laptop, notepad computer, PDA, cell phone, or any wireless access protocol (WAP) enabled device or any other computing device capable of interfacing directly or indirectly to the Internet or other network connection. Client device 110 may also be a server or other online processing entity that provides functionalities and processing to other client devices or programs, such as online processing entities that provide services to a plurality of disparate clients.

Client device 110 may run an HTTP/HTTPS client, e.g., a browsing program, such as Microsoft's Internet Explorer (or Edge, or Chromium) browser, Google's Chrome browser, Mozilla's Firefox browser, Netscape's Navigator browser, Opera's browser, or a WAP-enabled browser in the case of a cell phone, notepad computer, PDA or other wireless device, or the like. According to one embodiment, client device 110 and all of its components are configurable using applications, such as a browser, including computer code run using a central processing unit such as an Intel Pentium® processor or the like. However, client device 110 may instead correspond to a server configured to communicate with one or more client programs or devices, similar to a server corresponding to data ingestion system 120 that provides one or more APIs for interaction with client device 110.

Thus, client device 110 and/or data ingestion system 120 and all of their components might be operator configurable using application(s) including computer code to run using a central processing unit, which may include an Intel Pentium® processor or the like, and/or multiple processor units. A server for client device 110 and/or data ingestion system 120 may correspond to Windows®, Linux®, and the like operating system server that provides resources accessible from the server and may communicate with one or more separate user or client devices over a network. Exemplary types of servers may provide resources and handling for business applications and the like. In some embodiments, the server may also correspond to a cloud computing architecture where resources are spread over a large group of real and/or virtual systems. A computer program product embodiment includes a machine-readable storage medium (media) having instructions stored thereon/in which can be used to program a computer to perform any of the processes of the embodiments described herein utilizing one or more computing devices or servers.

Computer code for operating and configuring client device 110 and/or data ingestion system 120 to intercommunicate and to process webpages, applications and other data as described herein are preferably downloaded and stored on a hard disk, but the entire program code, or portions thereof, may also be stored in any other volatile or non-volatile memory medium or device, such as a read only memory (ROM) or random-access memory (RAM), or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory integrated circuits (ICs)), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, virtual private network (VPN), LAN, etc.) using any communication medium and protocols (e.g., TCP/IP, HTTP, HTTPS, Ethernet, etc.) as are well known. It will also be appreciated that computer code for implementing embodiments of the present disclosure can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun MicroSystems, Inc.).

Data Ingestion System with Staging Tables

FIG. 2 is a simplified diagram of micro-batch manager and staging tables for data ingestion of micro-batched data records according to some embodiments. Environment 200 of FIG. 2 includes a data ingestion system 120 having a micro-batch manager 130 discussed in reference to environment 100 of FIG. 1. In this regard, environment 200 displays exemplary tables of data records for persisting data to a database system, such as big data in one or more data warehouses In environment 200, data ingestion system 120 may utilize the components shown in environment 200 to ingest, process, and persist data records in a data warehouse, such as a database system used by and/or associated with an online service provider that generates, processes, and provides big data. This big data may correspond to large or extremely large data sets, which may include patterns and trends associated with users, user behaviors, and user interactions with other users through different computations including, analytics, reports, machine learning, and artificial intelligence models. Data ingestion system 120 may therefore receive data records over time, which may enter a message queue 202. Message queue 202 may correspond to a main queue used to ingest data into a data warehouse and persist the data as records within one or more databases and corresponding database tables of the data warehouse. Thus, message queue 202 may include a portion or all of the records for the incoming data (e.g., big data) along with any metadata, such as record size, target or destination table in a database, timestamp, and the like.

Thereafter, at step 1, micro-batch manager 120 receives the data records from message queue 202. Micro-batch manager 120 may be used to determine a batch processing job as a micro-batch of the incoming records from message queue. Micro-batch manager 120 may therefore accumulate the records belonging to the same data set (e.g., the same destination table) into a micro-batch. The micro-batch of records accumulated by micro-batch manager 120 may accumulate up to a set or ideal data size of the micro-batch and/or up to a certain time period or time interval in which the corresponding data is required to be or should be ingested into the data warehouse and persisted to the destination table (e.g., based on a scheduled job). For example, a dataset in a data warehouse may correspond to a particular database table, which has a configuration determining whether the dataset may only receive inserts of new data records, or if the dataset may further receive updates to existing records and/or deletes of existing records. Further, each dataset and/or micro-batch manager 130 may further define the threshold/maximum data batch size and/or the threshold/maximum period of time to accumulate records into a micro-batch (e.g., based on scheduled jobs to persist data to storage, which designates the processing threads). Thus, when incoming records for a destination dataset and table are received by micro-batch manager, a micro-batch having one or more records for persisting to the destination table is determined.

Where the datasets and corresponding tables for one or more micro-batches only accept inserts of new records, at step 2, micro-batch manager 130 generates append only tables 206. Append only tables 206 correspond to data tables having the records from the micro-batch generated for the destination table by micro-batch manager 130. An exemplary append only table 208 is shown in environment 200. Exemplary append only table 208 shows a data table having rows with each record and columns having the corresponding data, identifiers, and/or metadata for the particular record. Each record would be inserted to append only tables 206 from the corresponding micro-batch to create append only tables 206. Append only tables 206 may then be persisted to permanent or semi-permanent storage of the data warehouse by merging the records from append only tables 206 to the corresponding destination tables (e.g., a destination table 214 for one or more of append only tables 206 where destination table 214 may be the recipient of the corresponding records). This may utilize an insert operation to insert each corresponding record to the corresponding destination table. Thus, one or more destination tables may be updated to have new records inserted from one or more of append only tables 206.

However, if the datasets and corresponding tables for one or more micro-batches accept inserts, updates, and/or deletes, at step 2, micro-batch manager 120 generates staging tables 210. Staging tables 210 correspond to data tables having the records from the micro-batch generated for the destination table by micro-batch manager 130. For example, for a particular dataset corresponding to destination table 214, a micro-batch of records may be generated that include records for updates and/or deletes of existing records within destination table 214, as well as any inserts of new records. Micro-batch manager 130 may utilize the micro-batched records to generate one of staging tables 210 that includes the rows with each record and columns having the corresponding data, identifiers, and/or metadata for the particular record. Thus, each dataset and table that may accept updates and deletes in addition to inserts of records may have a corresponding one or more of staging tables 210 used to merge data.

In addition to these rows and columns, a merge instruction column may also be added to the corresponding staging table of staging tables 210. This merge instruction column is shown in exemplary staging table 212. For example, a column on the right of exemplary staging table 212 shows a column having an I/U/D identifier, where I corresponds to an insert instruction, U corresponds to an update instruction, and D corresponds to a delete instruction. Thus, an I in the column denotes that the record in the corresponding row is to be inserted to destination table 214, a U denotes that the record in the corresponding row is to be used to update an existing record in destination table 214, and a D denotes that the record in the corresponding row is to be deleted from existing record in destination table 214. Thus, the I/U/D indicates the corresponding operation type for the record in the row. Each record would be inserted to staging tables 210 from the corresponding micro-batch to create staging tables 210. An exemplary staging table appears as follows:

TABLE 1

| Column 1 | Column 2 | I/U/D |
| --- | --- | --- |
| Attribute 1 of Record 1 | Attribute 2 of Record 1 | I |
| Attribute 1 of Record 2 | Attribute 2 of Record 2 | U |
| Attribute 1 of Record 3 | Attribute 2 of Record 3 | D |

Once staging tables 212 are generated, at step 3 a destination merger 204 may be utilized as a merging operation and/or process to merge staging tables 210 with their corresponding destination dataset and table, such as destination table 214. Destination merger 204 may correspond to a component responsible to merge the data records held in staging tables 210 to their corresponding destination tables, such as destination table 214. Thus, destination merger 204 may include scheduled jobs to execute a MERGE standard query language (SQL) statement, or similar statement/operation, to fetch all the records in a particular one of staging tables 210 to merge with and persist to destination table 214. In this regard, the MERGE SQL statement may utilize the merge instruction column (e.g., the I/U/D column from exemplary staging table 212) to perform the corresponding merge operation for the record in that row, such as an insert, update, or delete operation. Additionally, in order to determine which staging table last updated a destination table and when, destination merger 204 may include a timestamp of the last time each destination table was updated. This may be compared to the staging table's timestamp (or a current time for the staging table), and if the staging tables timestamp is more recent than the destination table's timestamp with destination merger 204, the MERGE SQL statement may be executed.

Thus, if there is an I value or identifier in the merge instruction column, the record in the corresponding row may be inserted into destination table 214. If there is a U value or identifier in the merge instruction column, the record in the corresponding row may be used to update a corresponding existing record in destination table 214. Finally, if there is a D value or identifier in the merge instruction column, the record in the corresponding row may be identified for deletion of a corresponding existing record in destination table 214. An exemplary destination table 216 is shown in environment 200. In exemplary destination table 216, records are shown persisted to each row in exemplary destination table 216 in permanent and/or semi-permanent storage. Each row corresponds to a record having data, identifiers, metadata, and the like in the corresponding columns of the row. Once destination table 214 is updated, a timestamp corresponding to the update, or timestamp of the staging table used to update destination table 214, may be established with destination merger 204 and/or destination table 214 for use in future record persistence operations.

The scheduled jobs of destination merger 204 may be invoked as a single thread every X period of time for a particular dataset and table, such as every five seconds, where the single thread invokes and utilizes the MERGE SQL statement for the dataset and table using the corresponding staging table. Since this may be only a single thread for the staging table and corresponding destination table, there are no locks requiring the destination table to be locked to avoid conflicts, which impacts performance of the data warehouse. Further, since the MERGE SQL statement is run internally for the data warehouse, and further staging tables 210 and destination table 214 are internal to the data warehouse, the operation to merge the tables may be performed within a few seconds, providing real-time and/or near real-time updating of destination table 214. Thereafter, once destination table 214 is updated based on one or more of staging tables 210, such as by accepting the inserts, updates, and/or deletes, destination table 214 may then be used to display data reports and analytics, including big data reports for large data systems, as well as otherwise provide the data (e.g., for artificial intelligence training).

Figure 3:
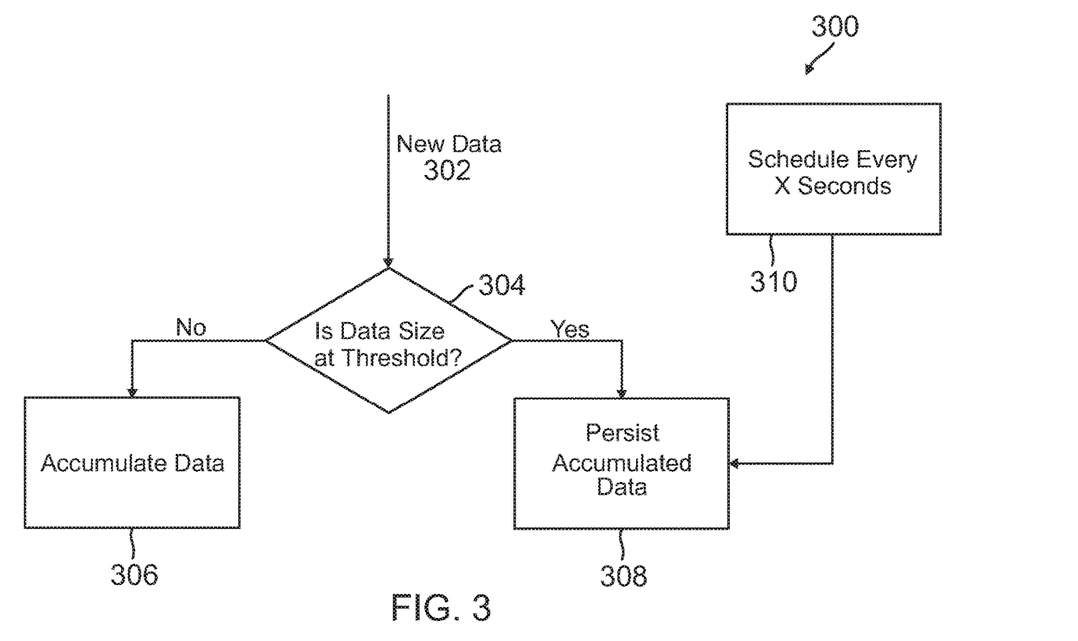
FIG. 3 is a simplified diagram of an exemplary process for generating a staging table with a merge instruction column for data records according to some embodiments.

FIG. 3 is a simplified diagram of an exemplary process for generating a staging table with a merge instruction column for data records according to some embodiments. Note that one or more steps, processes, and methods described herein of flowchart 300 may be omitted, performed in a different sequence, or combined as desired or appropriate. Flowchart 300 of FIG. 3 includes processes to generate a micro-batch and persist the micro-batch to an append only or staging table as discussed in reference to environments 100 and 200 of FIG. 1 and FIG. 2, respectively.

Flowchart 300 shows the operations that may be utilized in generating tables, such as append only tables 206 and staging tables 210 in environment 200. These tables may be utilized to persist data records to storage in a single thread without requiring locks on database tables and datasets in a data warehouse. In this regard, flowchart 300 may be utilized with one or more micro-batched records generated by micro-batch manager 130 of data ingestion system 120. At an initial block 302 of flowchart 300, new data arrives to micro-batch manager 130 from a data operation for persisting data to storage, such as message queue 202. New data may correspond to one or more data records for persisting to a database table of a data warehouse in one or more database tables, where the new data may correspond to incoming big data for reports and analytics (including artificial intelligence training) after storage.

At block 304, the new data from block 302 is added to an accumulated size of data by micro-batch manager 130. A micro-batch correspond to the accumulated records by the micro-batch manager. These new records are added to the total data size of the accumulated micro-batch until a total data size of the records meets or exceeds a threshold or maximum batch data size. This size may be set at 1 MB, in one embodiment, or may be larger or smaller as desired for the corresponding record persistence requirements. Further, a threshold micro-batching time period or data accumulation time period may also be set, after which, the micro-batch is set to be persisted to storage. This may be based on scheduled jobs to persist data to storage after X seconds, for example, using a processing thread on one or more tables of accumulated records. If the threshold batch data size and/or time period is not yet met, then at block 306, further data is accumulated, and additional records are added to the micro-batch for persisting. This may include accumulating the records in memory so that they may later be persisted to storage of the data warehouse.

However, once the threshold is reached, the micro-batch may begin to be processed for persistence to storage, such as within one or more database tables of the corresponding data warehouse, at block 308. When accumulated data of the records in a micro-batch is determined to be persisted at block 308, all the data in the micro-batch is packaged as records into a data file on a disk drive. This includes inserting the records (e.g., using a COPY SQL statement) into an append only table or a staging table for the file depending on the characteristics and parameters of the destination dataset and table. For example, where the data to be ingested corresponds to records in an append only table (e.g., where the destination table accepts only inserts of data records), the table for the micro-batched records may correspond to an append only table. This allows for ingesting of the data through a single thread that utilizes only insert operations to insert the new records from the append only table to the existing records of the destination table.

However, if the data to be ingested is configured as a staging table, such as when the destination table accepts updates and deletes in addition to inserts, the file may include a staging table having the records with a merge instruction column. The merge instruction column includes an identifier or value used to determine the type of operation to perform on the destination table using the record. This may include inserting (e.g., an "I") the new record into the destination table with the existing records, updating (e.g., a "U") an existing record in the destination table based on the changes to the record in the staging table, and/or deleting (e.g., a "D") of an existing record identified in the staging table from the destination table. Once one or more append only tables and/or the staging tables are generated for the micro-batches of records, at block 310, a scheduled job is executed as a single thread every X second (e.g., every five seconds) to persist the append only table(s) and/or staging table(s) to permanent and/or semi-permanent storage. This scheduled job may run every X seconds (e.g., the threshold time period) to check if there are accumulated micro-batches that were not yet persisted. In this manner, any micro-batches that have not yet reached the threshold batch data size (e.g., 1 MB) will still be persisted into the data warehouse in a timely manner (e.g., real-time or near real-time).

Figure 4:
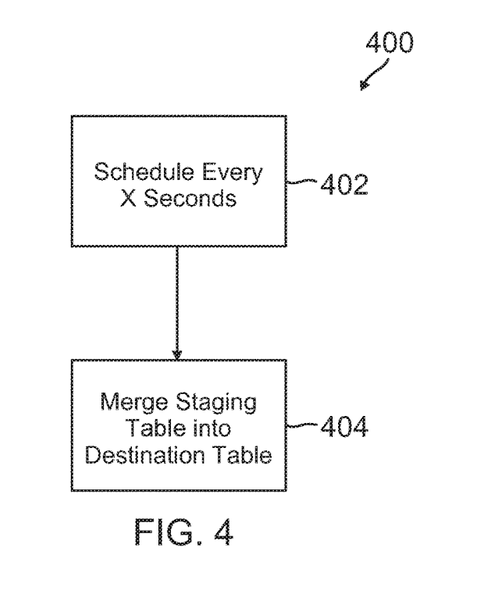
FIG. 4 is a simplified diagram of an exemplary process to persist data records to a database table using a staging table with a merge instruction column according to some embodiments.

FIG. 4 is a simplified diagram of an exemplary process to persist data records to a database table using a staging table with a merge instruction column according to some embodiments. Note that one or more steps, processes, and methods described herein of flowchart 400 may be omitted, performed in a different sequence, or combined as desired or appropriate. Flowchart 400 of FIG. 4 includes processes to persist records to permanent and/or semi-permanent storage in a data warehouse using a staging table as discussed in reference to environments 100, 200, and 300 of FIG. 1, FIG. 2, and FIG. 3, respectively.

Flowchart 400 shows the operations that may be performed to persist data records to storage in a data warehouse using staging tables having a merge instruction column, such as staging tables 210 in environment 200. These staging tables may be utilized to persist data records to storage in a single thread without requiring locks in databases of a data warehouse. In this regard, flowchart 400 may utilize staging tables generated by micro-batch manager 130 of data ingestion system 120. At an initial block 402 of flowchart 400, the process of persisting data to storage using a staging table is initiated, for example, from block 310 in environment 300. A scheduled job executes every X second, such as every five seconds in order to provide real-time or near real-time database updates of a data warehouse. At every scheduled job, an operation, such a merging operation 142 from database updater 140, performs calls to the staging table to merge the staging table with a destination table. For each dataset and destination table having a staging table requiring merging, a new thread is created so that all datasets and corresponding tables are merged in parallel at the same time. However, no two different threads are created which attempt to merge staging tables with the same dataset and destination table.

Thereafter, at block 404, staging data from the staging table is merged into the destination table. This includes executing a MERGE SQL statement to read the merge instruction column of the staging table and determine a merge operation to perform with each record in the corresponding row of the staging table. The merge operation may include an insert operation of a new record into the destination table, an update operation to update an existing record in the destination table with new data and/or attributes, or a delete operation to delete an existing record in the destination table. When doing so, a destination merger (e.g., destination merger 204) may be required to know when data was merged in the previous thread from a staging table. The destination merger may have a previous timestamp for each dataset to indicate the last time that data was merged from the staging table to the dataset's destination table. This is then compared to a current time and/or timestamp of the staging table to be merged, and if the previous timestamp is older, the destination merger may merge the data using the merge instruction column and corresponding merge operations. Pseudo code to implement the MERGE SQL statement may appear as follows:

Merge into DESTINATON_TABLE_1 from STAGING_TABLE_1 where timestamp>lastMergeTime.

Case IUD='I' do insert . . .
Case IUD='U' do update . . .
Case IUD='D' do delete . . .

However, after the MERGE SQL statement is complete, the records in the staging table are no longer required and should be deleted from the staging table for consistency and to avoid conflicts. Thereafter, a delete operation is performed to delete all of the records in the staging table, as well as their corresponding merge instructions. This may be performed using a DELETE SQL statement or the like with the staging table, shown as follows:

Delete from STAGING_TABLE_! Where timestamp>lastMergeTime and timestamp<currentTime.

Finally, the last step is to update the last merge time with the destination merger and/or destination table so that the previous timestamp shows a time when the destination table was last merged with a staging table. This may be performed by determining a time of the merging of the staging table with the destination table, and updating the timestamp associated with the destination table to this current time. For example, this may be represented as: lastMergeTime to the currentTime or lastMergedTime=currentTime.

Figure 5:
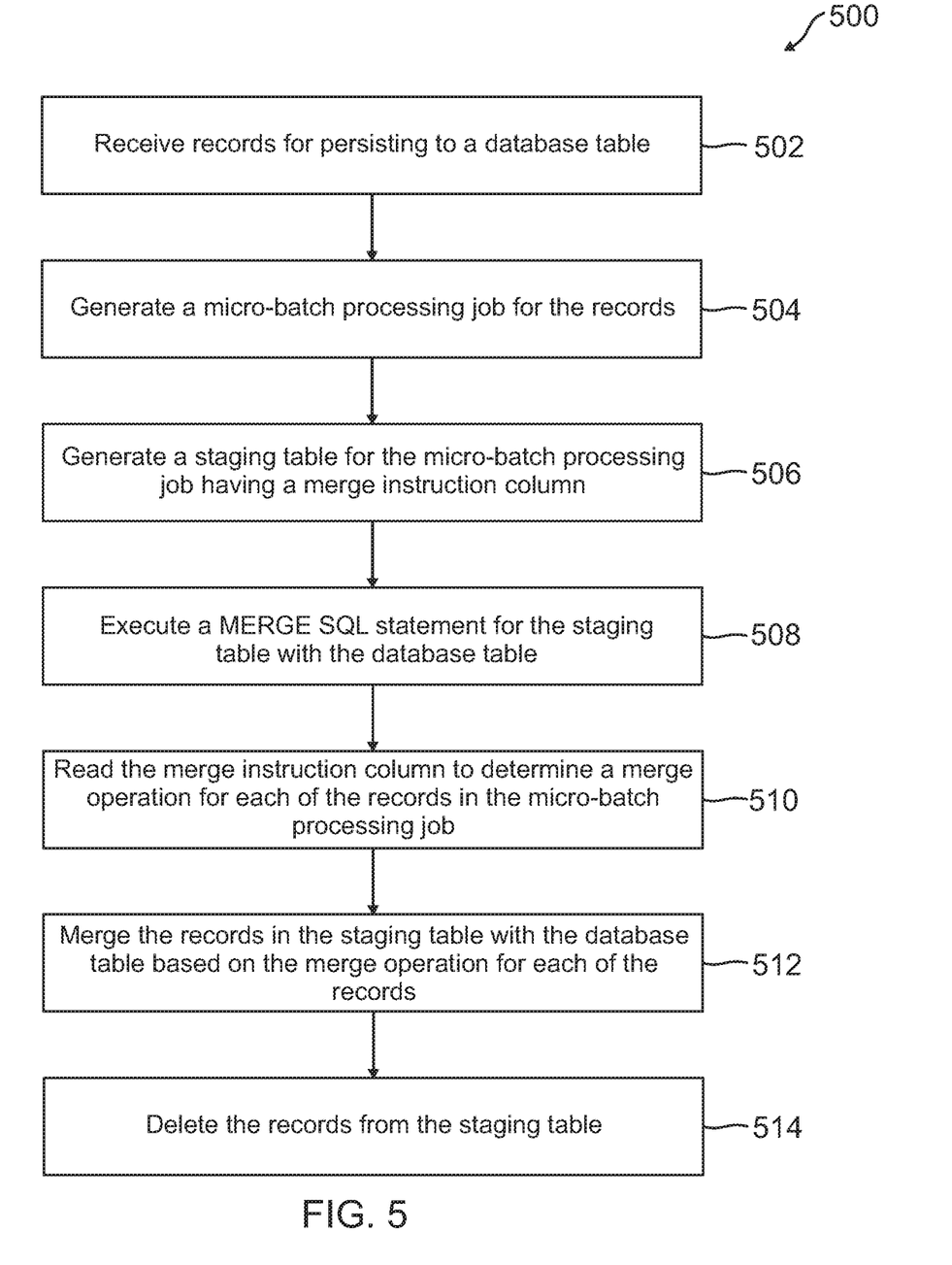
FIG. 5 is an exemplary flowchart for using staging tables for data ingestion of micro-batched data records according to some embodiments.

FIG. 5 is an exemplary flowchart for using staging tables for data ingestion of micro-batched data records according to some embodiments. In some embodiments, generation and utilization of staging tables for merging with destination tables described in method 500 of FIG. 5 can be implemented and performed using an online service provider system, such as data ingestion system 120. One or more of the processes 502-514 of method 500 may be implemented, at least in part, in the form of executable code stored on non-transitory, tangible, machine-readable media that when run by one or more processors may cause the one or more processors to perform one or more of the processes 502-514. In some embodiments, method 500 can be performed by one or more computing devices in environment 100 of FIG. 1.

At step 502, records for persisting to a database table are received, such as by a message queue of a data warehouse that may process and store big data for analytics, reports, training data, and the like. The message queue may then provide the records to a micro-batch manager that may batch one or more of the records into a micro-batch based on the target or destination database table, as well as a threshold batch data size and/or threshold accumulation time for records. Thereafter, a micro-batch processing job for the records is generated, at step 504, for example, by the micro-batch manager. The micro-batch processing job may be intended for the destination database table, including all or a subset of the records intended to be processed with the database table. Moreover, the micro-batch processing job may be limited in size based on a threshold batch data size. However, if the threshold batch data size is not reached by the time a schedule job is to be executed (e.g., based on the threshold accumulation period of time, which may correspond to a time interval for scheduled jobs to persist data), the micro-batch processing job may be generated with the records currently in the accumulated micro-batch.

Thereafter, based on the micro-batch processing job, a staging table for the micro-batch processing job is generated having a merge instruction column, at step 504. The staging table may correspond to a file of the accumulated records on a disk drive (e.g., volatile or non-volatile storage), which may be used for persisting to storage of the data warehouse. Each row of the staging table may correspond to a data record, where the staging table further includes a column having merge instructions (e.g., corresponding to an insert, update, or delete operation) for the record within the corresponding row. The staging table may be generated by the micro-batch manager and may therefore be provided to a destination merger for merging with the corresponding database table that is the target of the staging table. At step 508 a MERGE SQL statement for the staging table is executed with the corresponding database table in order to merge the records from the staging table (e.g., accumulated within the file) with the destination database table. This MERGE SQL statement may determine a last updated timestamp of the database table and check that the current time and/or timestamp of the staging table is more recent than the last updated timestamp.

If so, at step 510, the merge instruction column is read to determine a merge operation for each of the records in the micro-batch processing job. The merge instruction column may include an identifier or value, such as I for insert, U for update, or D for delete, that identifies the merge operation to perform using the record in the corresponding row for the merge instruction column. This allows for merging of all of the records from the staging table to the database table in a single thread without having to perform additional threads and operations for each individual record, thereby locking a database while database updates are performed. Thus, a single thread for each dataset and staging table allows for high concurrency with other threads running for other datasets and staging tables without individually locking the tables. This requires less resources to store data persistently and may be done in a faster and more coordinated manner with datasets that allow for updates and deletes in addition to insertions.

The records in the staging table are merged with the database table based on the merge operation for each of the records, at step 512. This may utilize the MERGE SQL statement perform the merge operation denoted for each record in the merge instruction column. Thereafter, the records of the database table may reflect the changes based on the staging table's records and corresponding merge operations, such as by inserting new records, updating existing records, and/or deleting existing records. This allows for solving of the locking problem for concurrent updates during database updates by merging internally in the data warehouse using a single thread per dataset. At step 514, the records from the staging table are deleted, for example, using a DELETE SQL statement to remove and delete all records in the staging table. In addition to deleting the records, a timestamp associated with a last time the destination database table was merged with the staging table is updated to a current time in order to reflect a last updated/merged time of the database table.

As discussed above and further emphasized here, FIGS. 1, 2, 3, 4, and 5, are merely examples of data ingestion system 120 and corresponding methods for utilizing staging tables to persist data to destination tables, which examples should not be used to unduly limit the scope of the claims. One of ordinary skill in the art would recognize many variations, alternatives, and modifications.

Figure 6:
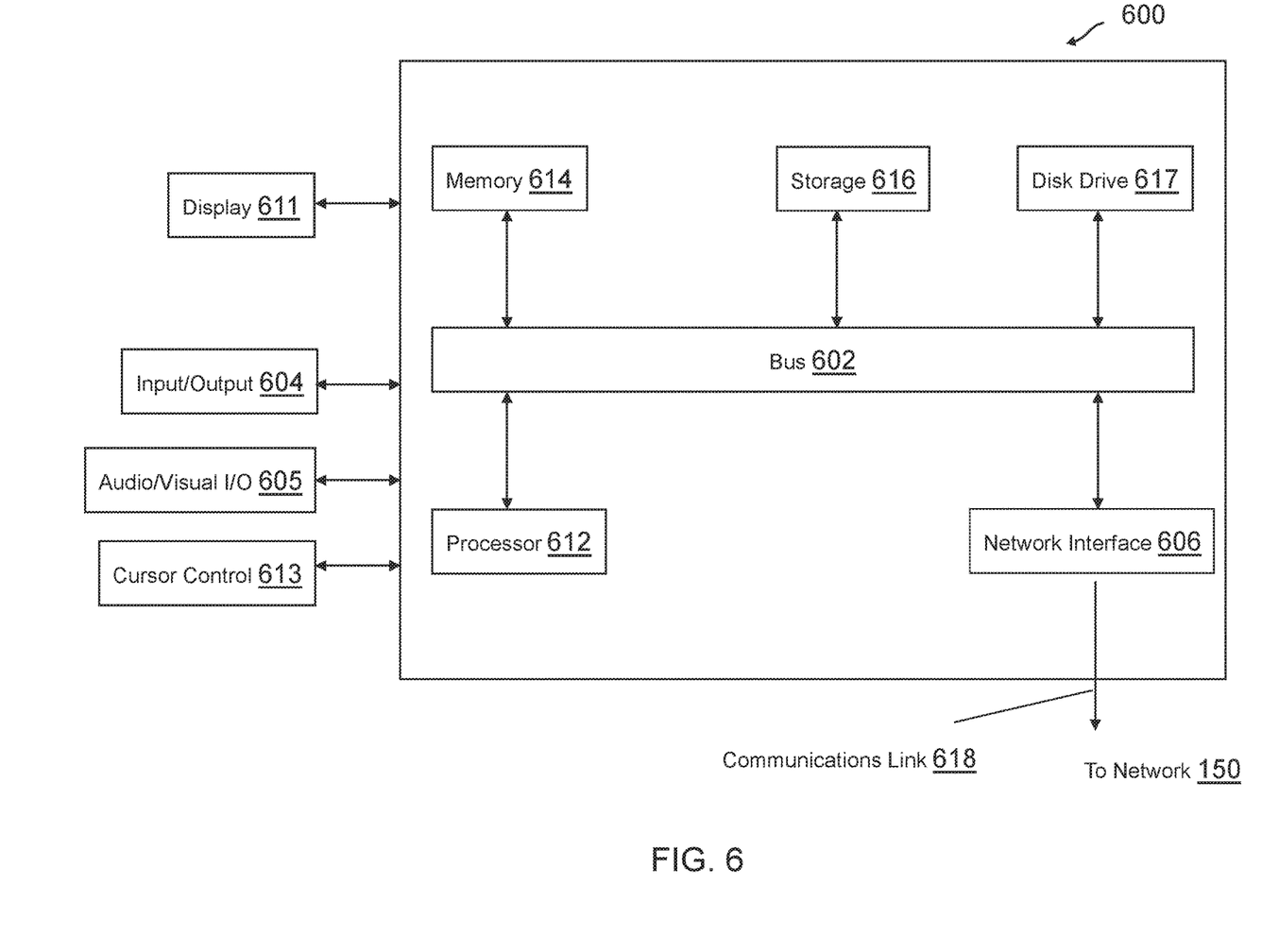
FIG. 6 is a simplified diagram of a computing device according to some embodiments.

FIG. 6 is a block diagram of a computer system suitable for implementing one or more components in FIGS. 1 and 2, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 600 in a manner as follows.

Computer system 600 includes a bus 602 or other communication mechanism for communicating information data, signals, and information between various components of computer system 600. Components include an input/output (I/O) component 604 that processes a user action, such as selecting keys from a keypad/keyboard, selecting one or more buttons, image, or links, and/or moving one or more images, etc., and sends a corresponding signal to bus 602. I/O component 604 may also include an output component, such as a display 611 and a cursor control 613 (such as a keyboard, keypad, mouse, etc.). An optional audio/visual input/output component 605 may also be included to allow a user to use voice for inputting information by converting audio signals. Audio/visual I/O component 605 may allow the user to hear audio, and well as input and/or output video. A transceiver or network interface 606 transmits and receives signals between computer system 600 and other devices, such as another communication device, service device, or a service provider server via network 150. In one embodiment, the transmission is wireless, although other transmission mediums and methods may also be suitable. One or more processors 612, which can be a micro-controller, digital signal processor (DSP), or other processing component, processes these various signals, such as for display on computer system 600 or transmission to other devices via a communication link 618. Processor(s) 612 may also control transmission of information, such as cookies or IP addresses, to other devices.

Components of computer system 600 also include a system memory component 614 (e.g., RAM), a static storage component 616 (e.g., ROM), and/or a disk drive 617. Computer system 600 performs specific operations by processor(s) 612 and other components by executing one or more sequences of instructions contained in system memory component 614. Logic may be encoded in a computer readable medium, which may refer to any medium that participates in providing instructions to processor(s) 612 for execution. Such a medium may take many forms, including but not limited to, non-volatile media, volatile media, and transmission media. In various embodiments, non-volatile media includes optical or magnetic disks, volatile media includes dynamic memory, such as system memory component 614, and transmission media includes coaxial cables, copper wire, and fiber optics, including wires that comprise bus 602. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Although illustrative embodiments have been shown and described, a wide range of modifications, changes and substitutions are contemplated in the foregoing disclosure and in some instances, some features of the embodiments may be employed without a corresponding use of other features. One of ordinary skill in the art would recognize many variations, alternatives, and modifications of the foregoing disclosure. Thus, the scope of the present application should be limited only by the following claims, and it is appropriate that the claims be construed broadly and in a manner consistent with the scope of the embodiments disclosed herein.

What is claimed is:

1. A data ingestion system configured to provide near real-time updates to data tables for a data warehouse using a micro-batch manager, the data ingestion system comprising:

a processor and a computer readable medium operably coupled thereto, the computer readable medium comprising a plurality of instructions stored in association therewith that are accessible to, and executable by, the processor, to perform table updating operations which comprise:

receiving, over a network by the micro-batch manager of the data ingestion system for the data warehouse independent of causing a lock of the data tables of the data warehouse, a plurality of records from a message queue for a first destination table of the data tables;

generating, by the micro-batch manager, a micro-batch processing job for persisting the plurality of records to the first destination table, wherein the micro-batch processing job includes a merge operation for each of the plurality of records;

generating, by the micro-batch manager, a first staging data table using the micro-batch processing job;

adding, by the micro-batch manager, a merge instruction column to the first staging data table, wherein the merge instruction column comprises the merge operation for each of the plurality of records in the first staging data table;

determining, independent of causing the lock of the data tables, whether a time period has expired for the first staging data table meeting or exceeding a threshold data batch size for persisting the plurality of records to the first destination table of the data tables;

responsive to the determining, executing a merge Structured Query Language (SQL) statement to merge the first staging data table with the first destination table;

accessing the first staging data table generated by the micro-batch manager for the first destination table of the data tables for the data warehouse, wherein the first staging data table comprises the plurality of records designated for the first destination table;

reading the merge instruction column of the first staging data table for the plurality of records;

determining the merge operation for each of the plurality of records from reading the merge instruction column;

merging the plurality of records from the first staging data table to the first destination table using the merge operation for each of the plurality of records; and deleting the plurality of records from the first staging data table after merging the plurality of records from the first staging data table to the first destination table.

2. The data ingestion system of claim 1, wherein the merge SQL statement is executed in response to determining that the first staging data table meets or exceeds the threshold data batch size.

3. The data ingestion system of claim 1, wherein the merge SQL statement is executed in response to determining that the time period has expired.

4. The data ingestion system of claim 1, wherein the merge instruction column of the first staging data table comprises one of an insert instruction, an update instruction, or a delete instruction corresponding to each of the plurality of records, and wherein a second staging data table corresponds to a second destination table of the data tables and comprises an append table to perform data record insertions to the second destination table without using a corresponding merge instruction column.

5. The data ingestion system of claim 1, wherein, before executing the merge SQL statement, the table updating operations further comprise:
determining that the micro-batch processing job requires splitting into at least one additional micro-batch processing job based on a data size of the micro-batch processing job; and
splitting the micro-batch processing job into the at least one additional micro-batch processing job for at least one additional staging data table.

6. The data ingestion system of claim 1, wherein, before receiving the plurality of records, the table updating operations further comprise:
determining, by the micro-batch manager, a size for at least one of micro-batch processing job or the first staging data table,
and wherein merging the plurality of records from the first staging data table to the first destination table of the data tables is performed by a destination merger of the data ingestion system.

7. The data ingestion system of claim 1, wherein deleting the plurality of records from the first staging data table comprises:
determining that a last merge timestamp of the first destination table of the data tables is prior to a current time associated with merging the plurality of records from the first staging data table to the first destination table;

executing a delete SQL statement with the first staging data table to delete the plurality of records from the first staging data table; and
updating the last merge timestamp to a current timestamp corresponding to the current time.

8. The data ingestion system of claim 1, wherein the table updating operations are performed by a plurality of data processing threads in the data ingestion system for big data analytics using the near real-time updates of the data tables.

9. A method to provide near real-time updates to data tables for a data warehouse using a micro-batch manager of a data ingestion system, the method comprising:
receiving, over a network by the micro-batch manager of the data ingestion system for the data warehouse independent of causing a lock of the data tables of the data warehouse, a plurality of records from a message queue for a first destination table of the data tables;
generating, by the micro-batch manager, a micro-batch processing job for persisting the plurality of records to the first destination table, wherein the micro-batch processing job includes a merge operation for each of the plurality of records;
generating, by the micro-batch manager, a first staging data table using the micro-batch processing job;
adding, by the micro-batch manager, a merge instruction column to the first staging data table, wherein the merge instruction column comprises the merge operation for each of the plurality of records in the first staging data table;
determining, independent of causing the lock of the data tables, whether a time period has expired for the first staging data table meeting or exceeding a threshold data batch size for persisting the plurality of records to the first destination table of the data tables;
responsive to the determining, executing a merge Structured Query Language (SQL) statement to merge the first staging data table with the first destination table;
accessing the first staging data table generated by the micro-batch manager for the first destination table of the data tables for the data warehouse, wherein the first staging data table comprises the plurality of records designated for the first destination table;
reading the merge instruction column of the first staging data table for the plurality of records;
determining the merge operation for each of the plurality of records from reading the merge instruction column;
merging the plurality of records from the first staging data table to the first destination table using the merge operation for each of the plurality of records; and
deleting the plurality of records from the first staging data table after merging the plurality of records from the first staging data table to the first destination table.

10. The method of claim 9, wherein the merge SQL statement is executed in response to determining that the first staging data table meets or exceeds the threshold data batch size.

11. The method of claim 9, wherein the merge SQL statement is executed in response to determining that the time period has expired.

12. The method of claim 9, wherein the merge instruction column of the first staging data table comprises one of a insert instruction, an update instruction, or a delete instruction corresponding to each of the plurality of records, and wherein a second staging data table corresponds to a second destination table of the data tables and comprises an append table to perform data record insertions to the second destination table without using a corresponding merge instruction column.

13. The method of claim 9, wherein, before executing the merge SQL statement, the method further comprises:
   determining that the micro-batch processing job requires splitting into at least one additional micro-batch processing job based on a data size of the micro-batch processing job; and
   splitting the micro-batch processing job into the at least one additional micro-batch processing job for at least one additional staging data table.

14. The method of claim 9, wherein, before receiving the plurality of records, the method further comprises:
   determining, by the micro-batch manager, a size for at least one of micro-batch processing job or the first staging data table,
   and wherein merging the plurality of records from the first staging data table to the first destination table of the data tables is performed by a destination merger of the data ingestion system.

15. The method of claim 9, wherein deleting the plurality of records from the first staging data table comprises:
   determining that a last merge timestamp of the first destination table of the data tables is prior to a current time associated with merging the plurality of records from the first staging data table to the first destination table;
   executing a delete SQL statement with the first staging data table to delete the plurality of records from the first staging data table; and
   updating the last merge timestamp to a current timestamp corresponding to the current time.

16. The method of claim 9, wherein at least generating, by the micro-batch manager, the micro-batch processing job is performed by one of a plurality of data processing threads in the data ingestion system for big data analytics using the near real-time updates of the data tables.

17. A non-transitory computer-readable medium having stored thereon computer-readable instructions executable to provide near real-time updates to data tables for a data warehouse using a micro-batch manager of a data ingestion system, the computer-readable instructions executable to perform table updating operations which comprises:
   receiving, over a network by the micro-batch manager of the data ingestion system for the data warehouse independent of causing a lock of the data tables of the data warehouse, a plurality of records from a message queue for a first destination table of the data tables;
   generating, by the micro-batch manager, a micro-batch processing job for persisting the plurality of records to the first destination table, wherein the micro-batch processing job includes a merge operation for each of the plurality of records;
   generating, by the micro-batch manager, a first staging data table using the micro-batch processing job;
   adding, by the micro-batch manager, a merge instruction column to the first staging data table, wherein the merge instruction column comprises the merge operation for each of the plurality of records in the first staging data table;
   determining, independent of causing the lock of the data tables, whether a time period has expired for the first staging data table meeting or exceeding a threshold data batch size for persisting the plurality of records to the first destination table of the data tables;
   responsive to the determining, executing a merge Structured Query Language (SQL) statement to merge the first staging data table with the first destination table;
   accessing the first staging data table generated by the micro-batch manager for the first destination table of the data tables for the data warehouse, wherein the first staging data table comprises the plurality of records designated for the first destination table;
   reading the merge instruction column of the first staging data table for the plurality of records;
   determining the merge operation for each of the plurality of records from reading the merge instruction column;
   merging the plurality of records from the first staging data table to the first destination table using the merge operation for each of the plurality of records; and
   deleting the plurality of records from the first staging data table after merging the plurality of records from the first staging data table to the first destination table.

* * * * *